(12) United States Patent
Jaffer

(10) Patent No.: US 6,747,593 B1
(45) Date of Patent: Jun. 8, 2004

(54) GENERALIZED CLUTTER TUNING FOR BISTATIC RADAR SYSTEMS

(75) Inventor: Amin G. Jaffer, Fullerton, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/609,029

(22) Filed: Jun. 26, 2003

(51) Int. Cl.[7] .......................... G01S 13/00; G01S 7/292
(52) U.S. Cl. ........................................ 342/160; 342/159
(58) Field of Search ................ 342/159, 160, 342/59, 25

(56) References Cited

U.S. PATENT DOCUMENTS

| | | | | |
|---|---|---|---|---|
| 4,246,580 A | * | 1/1981 | Caputi, Jr. | 342/25 |
| 5,546,087 A | * | 8/1996 | Martin Neira | 342/120 |
| 6,545,633 B1 | * | 4/2003 | Jensen | 342/59 |
| 6,614,386 B1 | * | 9/2003 | Moore et al. | 342/160 |

* cited by examiner

Primary Examiner—Ian J. Lobo
(74) Attorney, Agent, or Firm—Leonard A. Alkov

(57) ABSTRACT

A system and method for controlling clutter Doppler spread in a bistatic radar system is developed resulting in enhanced detection of low-Doppler targets or improved SAR mode performance. In an illustrative embodiment, a bistatic radar system (10) includes a transmitter (12) for transmitting electromagnetic energy (106) towards a target (16), a receiver (14) adapted to receive the electromagnetic energy (116) reflected from the target (16), and a processor (122) for optimizing a parameter or parameters of the system such that the directional derivative of the bistatic Doppler field along the isorange contour is near a desired value. The parameters to be optimized may include the transmitter velocity vector, the receiver velocity vector, or the receiver azimuth flight direction. The desired value is the minimal absolute value of the directional derivative in order to minimize the clutter Doppler spread, or the maximum absolute value of the directional derivative in order to maximize the clutter Doppler spread.

26 Claims, 6 Drawing Sheets

GENERALIZED CLUTTER TUNING FOR BISTATIC RADAR SYSTEMS

BACKGROUND OF THE INVENTION

1. Field of the Invention

The present invention relates to radar systems. More specifically, the present invention relates to bistatic radar systems.

2. Description of the Related Art

In a monostatic radar system, the transmitter and the receiver are co-located. In a bistatic radar architecture, the transmitter and receiver are substantially separated. In addition, both the transmitter and the receiver may be mounted on either fixed or moving platforms. Bistatic radar is therefore distinguished from monostatic radar where the transmitter and receiver are mounted on the same platform and move together.

When the transmitter and/or the receiver is in motion, the reflected signal will be Doppler frequency shifted as a function of relative motions and positions of the transmitter and receiver and the position of the target. In effect, the motions and positions of the transmitter and receiver paint the landscape with a spatial Doppler frequency gradient. If the target is also in motion, its reflected signal will have an additional Doppler shift dependent on the target's velocity vector.

With conventional airborne monostatic radar systems, it is often difficult to detect "slow moving" targets (targets which generate low Doppler shifts) in surface clutter due to the clutter Doppler spread resulting from the varying Doppler shifts of the terrain illuminated by the radar transmit beam. This can mask the target return if its Doppler shift is within the mainbeam clutter Doppler spread (the clutter Doppler shift over a range cell). For monostatic radar systems, the clutter Doppler spread depends on the motion of the radar platform relative to the transmit look direction. This motion is usually fixed due to system constraints and is not free to be optimized. For bistatic radar systems, however, the clutter Doppler spread is due to the combined motion of both the transmitter and receiver which are mounted on separate platforms. Because the motions of the transmitter and receiver are independent, they are free to be optimized in order to control the bistatic clutter Doppler spread. This process is known as "clutter tuning."

According to conventional analysis, when the motion of the receiver is in the opposite direction to that of the transmitter, the receiver's Doppler frequency shift for a particular terrain object, situated equidistant from the transmitter and receiver, partially or completely cancels the transmitter's Doppler shift. This cancellation condenses the clutter Doppler spectrum into a narrowed frequency spectrum, while a moving target's Doppler frequency offset remains nearly the same with respect to the terrain center frequency. The returns from relatively slow moving targets may therefore be found outside the clutter spectrum and may become highly observable. Thus, by suitably opposed motions of the transmitter and receiver for the foregoing restricted scenario, a bistatic radar system can become much more effective at detecting slowly moving targets than an equivalent monostatic radar wherein slow moving targets are lost in clutter. The practical problem is how to oppose the motion of the transmitter and receiver so as to achieve substantial clutter condensation, when the target location relative to the transmitter and receiver is not constrained in any manner.

One widely accepted method of flying the transmitter and receiver is to have them both on the same side of the target, but flying in opposite directions (e.g. one clockwise and the other counterclockwise). This solution gives good range resolution, but it reduces the duration of continuous observation of a given target area since the aircraft rapidly fly out of the region where standard analysis predicts good performance for detecting moving targets.

Thus, while bistatic radar provides a theoretically interesting class of solutions to the problem of detecting targets which are moving slowly with respect to surface clutter, heretofore these bistatic solutions have not been considered to be more than of passing interest because they are too constraining to be applied in practice. The conventional criterion requiring equal and opposite transmitter and receiver velocities is valid only for a particular transmitter-receiver-target geometry, is unduly restrictive on the motion of the receiver and is generally incapable of being satisfied in practical radar systems.

Hence, a need exists in the art for an improved system or method for detecting low Doppler targets which is capable of greater operational flexibility than prior art methods.

SUMMARY OF THE INVENTION

The need in the art is addressed by the system and method for controlling clutter Doppler spread in a bistatic radar system of the present invention, resulting in enhanced detection of low-Doppler targets in clutter or improved SAR (synthetic aperture radar) performance. In an illustrative embodiment, a bistatic radar system includes a transmitter for transmitting electromagnetic energy toward a target, a receiver adapted to receive the electromagnetic energy reflected from the target, and a processor for optimizing a parameter or parameters of the system such that the directional derivative of the bistatic Doppler field along the isorange contour is near a desired value. The parameters to be optimized may include the transmitter velocity vector, the receiver velocity vector, or the receiver azimuth flight direction. The desired value is the minimal absolute value of the directional derivative in order to minimize the clutter Doppler spread, or the maximum absolute value of the directional derivative in order to maximize the clutter Doppler spread.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
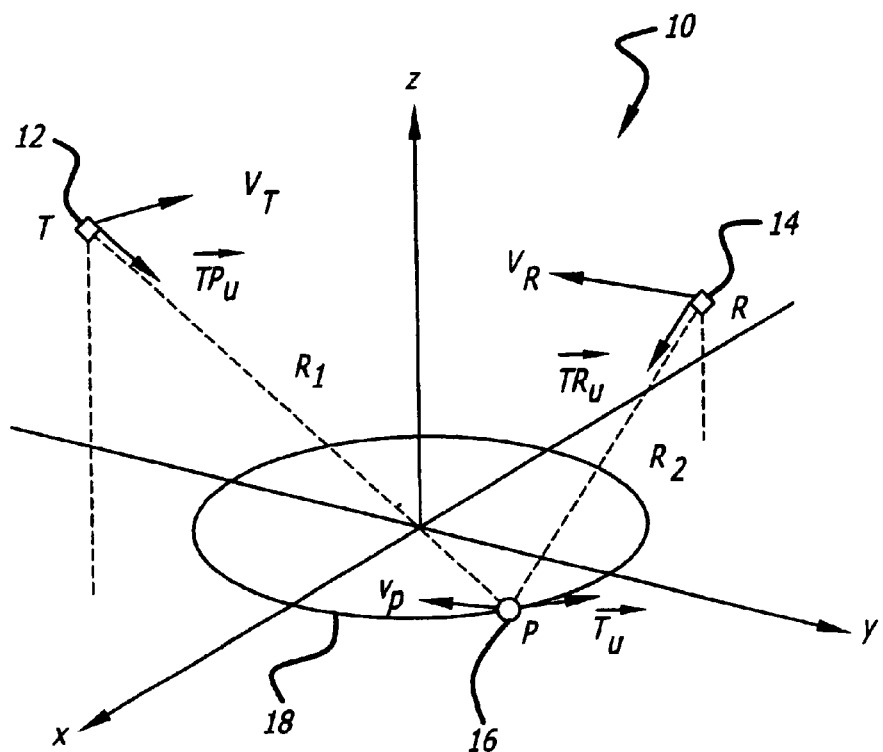
FIG. 1 is a diagram showing a transmitter-receiver-target geometry for an illustrative embodiment of a bistatic radar system implemented in accordance with the teachings of the present invention.

FIG. 1 is a diagram showing a transmitter-receiver-target geometry for an illustrative embodiment of a bistatic radar system implemented in accordance with the teachings of the present invention. The bistatic radar system 10 includes a transmitter 12 at a point T moving at a transmitter velocity vector $v_T$, a receiver 14 located at a point R moving at a receiver velocity vector $v_R$, and a target 16 located at a point P moving at a target velocity vector $v_P$. The transmitter 12 is located a distance $R_1$ from the target 16, and the receiver 14 is located a distance $R_2$ from the target 16. Also shown in FIG. 1 is the bistatic isorange ellipse 18 at the target point P. The isorange ellipse 18 represents the points of equal bistatic range ($R_1+R_2$). In the illustrative example, the target 16 is located in the x-y plane (such that its z-component is zero) which has been arbitrarily defined as an approximation to the earth surface. The transmitter 12, receiver 14, and target 16, however, can be arranged in any general configuration without departing from the scope of the present teachings.

Figure 2:
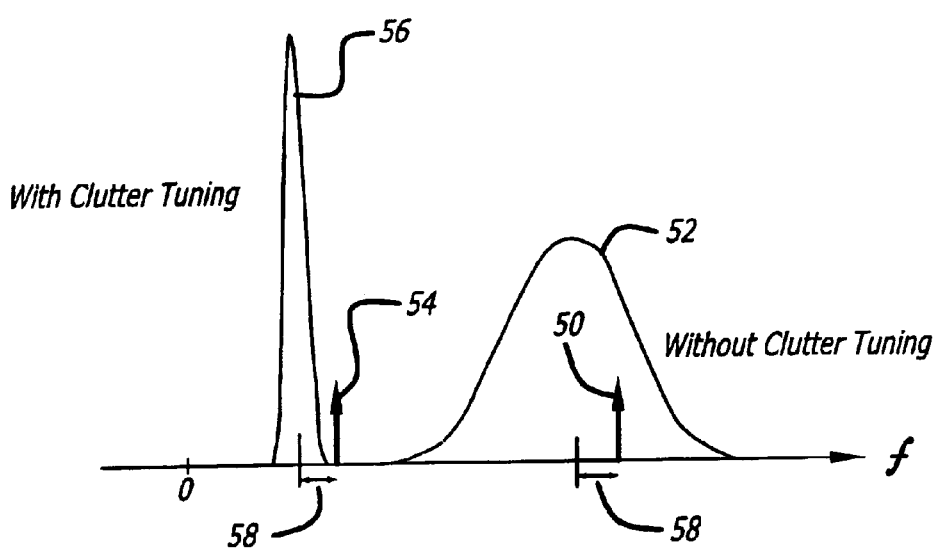
FIG. 2 is a graph illustrating the concept of clutter tuning for a GMTI (Ground Moving Target Indication) application.

FIG. 2 is a graph illustrating the concept of clutter tuning for a GMTI (Ground Moving Target Indication) application. Without clutter tuning, the Doppler frequency shift of a moving target 50 may be masked by the clutter Doppler spread of the terrain 52. Clutter tuning narrows the mainlobe clutter Doppler spread so that the target Doppler 54 is outside of the clutter Doppler spectrum 56. This is accomplished by optimizing the motions of the transmitter and/or receiver. The Doppler shift of the moving target contains an additional component (the target Doppler offset 58) which is independent of the transmitter and receiver velocity vectors. Adjusting the transmitter and/or receiver motions to narrow the Doppler spread therefore does not affect the target Doppler offset.

The condition for minimizing clutter Doppler spread according to conventional analysis is given by:

$$\frac{v_T}{R_1} = -\frac{v_R}{R_2} \quad [1]$$

As mentioned above, this condition is unduly restrictive on the motion of the receiver and is generally incapable of being satisfied in practical radar systems. Furthermore, this equation was derived under the assumption that the transmitter and receiver velocity vectors are orthogonal to their corresponding line-of-sight vectors to the target point. This simplification made the analysis easy, but it also created a blind spot in the analytical approach which has, here, been overcome.

In order to provide a foundation for illustrative embodiments, it is essential that some new theoretical ideas be introduced. A simplified exposition provides the key ideas.

Consider the scenario depicted in FIG. 1. The bistatic Doppler shift $f_D$ at a target point with coordinates (x,y,z) due to the combined motion of the transmitter and receiver is given by:

$$f_D(x, y, z) = \frac{1}{\lambda}\left[v_T \cdot \vec{TP}_u + v_R \cdot \vec{RP}_u\right] \quad [2]$$

where the dot denotes the dot product of vectors, $\vec{TP}_u$ and $\vec{RP}_u$ are the unit line-of-sight vectors from the transmitter and receiver to the target point, respectively, and $\lambda$ is the wavelength of the radar. Note that for GMTI applications, the target is on the ground at a point (x, y) where the z-component is zero.

All points which lie within the main lobe of the transmit beam and the receive beam generate different Doppler shifts. The total of these Doppler shifts is the mainlobe Doppler spread. Computing the Doppler gradient vector gives the rate of change of the Doppler shift with respect to the position of the target point.

The Doppler spatial gradient vector $\nabla f_D$ can be obtained by differentiating Eqn. 1 with respect to the variables x and y and simplifying:

$$\nabla f_D = \left[\frac{\partial f_D}{\partial x} \frac{\partial f_D}{\partial y}\right]^T \quad [3]$$

$$= \frac{1}{\lambda}\left\{\frac{v_T - (v_T \cdot \vec{TP}_u)\vec{TP}_u}{R_1} + \frac{v_R - (v_R \cdot \vec{RP}_u)\vec{RP}_u}{R_2}\right\} \quad [4]$$

The first term inside the curly brackets of Eqn. 4 represents the velocity vector of the transmitter with the component along the line-of-sight direction $\vec{TP}_u$ from the transmitter to the target point subtracted off, i.e. it represents the component of the transmitter velocity vector orthogonal to the $\vec{TP}_u$ vector. Similarly, the second term inside the brackets represents the component of the receiver velocity vector orthogonal to the $\vec{RP}_u$ vector.

Note that application of the conventional assumption that the transmitter and receiver velocity vectors are orthogonal to their corresponding line-of-sight vectors to the target point (by substituting $v_T \cdot \vec{TP}_u = 0$ and $v_R \cdot \vec{RP}_u = 0$) to Eqn. 4 causes the Doppler gradient vector to reduce to:

$$\nabla f_D = \frac{1}{\lambda}\left\{\frac{v_T}{R_1} + \frac{v_R}{R_2}\right\} \quad [5]$$

Setting this expression to zero (minimizing the Doppler spread) results in the conventional "counter-rotation" condition of Eqn. 1.

The method described here, on the other hand, starts with the general expression for the Doppler gradient given by Eqn. 4. Furthermore, it is recognized that the clutter Doppler spread in a range cell depends not just on the Doppler gradient vector, but rather on its component tangential to the bistatic range contour (which is an ellipse if a local flat earth approximation is used). This assumes that the Doppler variation normal to the range contour is very small compared to the tangential variation, which is most often the case since the "thickness" of the range cell, for commonly used waveform bandwidths, is small in comparison with the mainlobe range extent. Consequently, the magnitude of the component of the Doppler gradient along the bistatic range contour at the target point P should be minimized in order to minimize clutter Doppler spread. This component is also called the directional derivative of the bistatic Doppler field.

The method of the present invention optimizes the transmitter and/or receiver motions so as to make the Doppler gradient as close to being normal to the isorange contour so that the Doppler directional derivative along the tangent is close to zero. This is the optimum condition for minimizing the clutter Doppler spread and enhancing the detection of slow-moving targets whose Doppler shifts will now tend to fall outside the mainlobe reduced clutter Doppler spread (GMTI processing). This method can also be used for improving bistatic SAR (synthetic aperture radar) performance by determining the optimal transmitter and receiver motions that maximize the clutter Doppler spread in a range cell. This occurs when the Doppler gradient along the tangent to the isorange contour is maximized.

The following is an illustrative method for computing the Doppler directional derivative along the isorange contour. Other methods may be used to compute the directional derivative without departing from the scope of the present teachings.

The bistatic isorange contour on the local flat earth is a representation of the condition $R_1+R_2$=constant which represents an ellipse whose equation is a general equation of the second degree of the form:

$$ax^2+by^2+2cxy+dx+ey+f=0 \qquad [6]$$

whose coefficients (a, b, c, d, e, and f) are obtained from the given transmitter-receiver-target geometry. Differentiating Eqn. 6 with respect to x yields the slope of the isorange tangent vector at (x,y), and normalizing obtains the unit tangent vector $\vec{T}_u$. The absolute value of the directional derivative is then given by:

$$J(v_R,v_T)=|\nabla f_D \cdot \vec{T}_u| \qquad [7]$$

For most applications, the transmitter motion $v_T$ is fixed and known, and the receiver motion is to be optimized. For a case of most common interest, only the receiver flight azimuth direction θ is to be varied while the speed and altitude are maintained constant. In that case, the receiver velocity vector becomes:

$$v_R=|v_R|[\cos\theta \sin\theta\ 0] \qquad [8]$$

where $|v_R|$ denotes the speed of the receiver. Eqn. 7 then becomes a function of only the receiver flight azimuth direction, θ, which can be varied over a full 360 degree range to determine its low and high values which represent the favorable directions for GMTI and SAR processing respectively.

Figure 3:
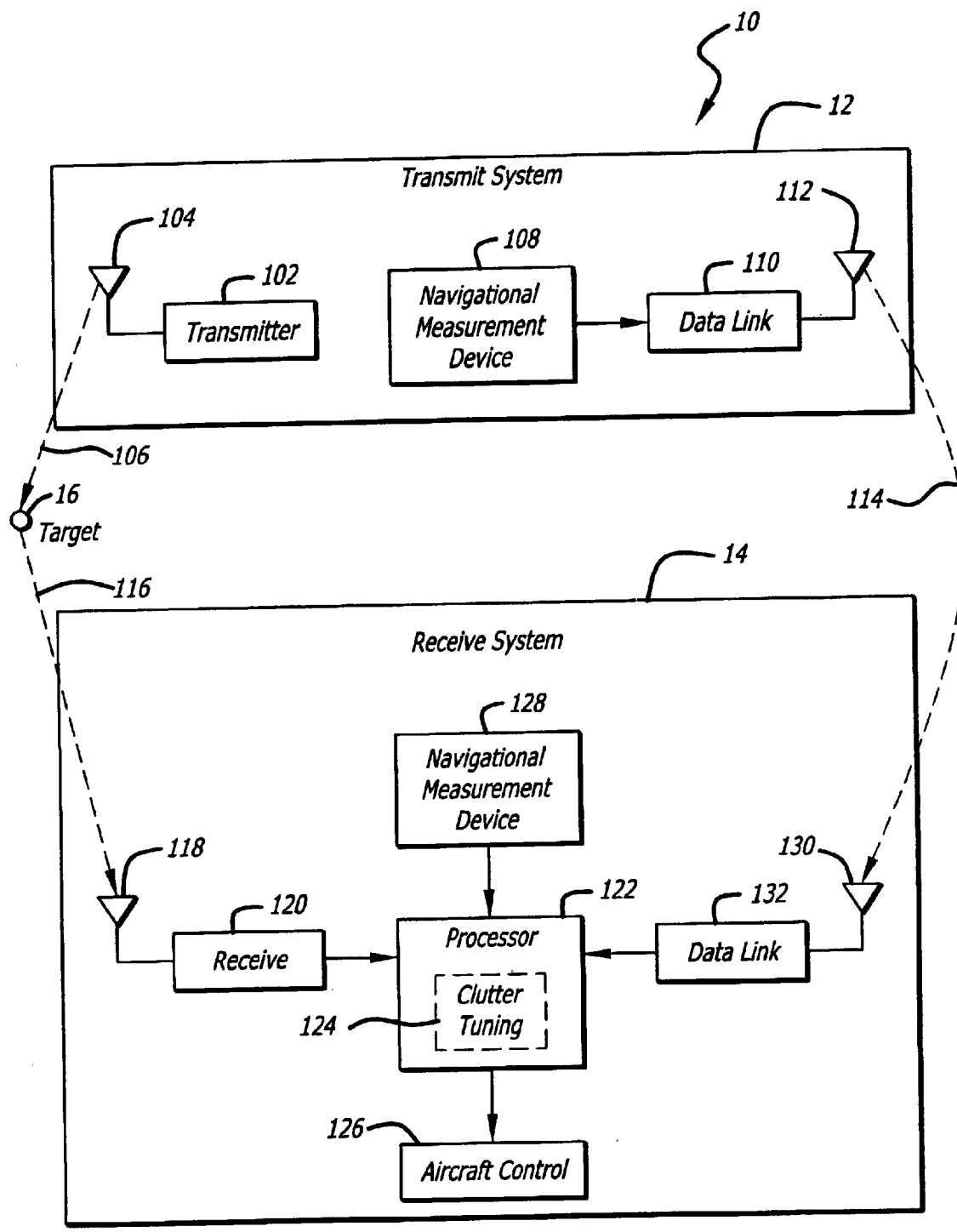
FIG. 3 is a simplified block diagram of an illustrative embodiment of a bistatic radar system implemented in accordance with the teachings of the present invention.

FIG. 3 is a simplified block diagram of an illustrative embodiment of a bistatic radar system 10 implemented in accordance with the teachings of the present invention. A transmit system 12 illuminates a target 16 with a beam of electromagnetic energy 106 and a reflected return signal 116 is received and processed by a receive system 14. The transmit system 12 includes a transmitter 102 coupled to an antenna 104 for transmitting the beam of electromagnetic energy 106 towards the target 16. The transmit system 12 may also include a navigation measurement device 108. The purpose of this device is to accurately determine, relative to the Earth, the location of the transmitter antenna 104. It also must determine, with adequate precision, the pointing direction of the antenna 104 relative to the Earth. The navigation measurement device 108 may make use of global positioning satellite (GPS) data as well as inertial measurement unit (IMU) data derived from an IMU located on the antenna 104. The transmitter antenna information is communicated to a data link transmitter 110. A data link path signal 114 is then communicated through a data link antenna 112.

The return beam 116 reflected from the target 16 is then received by an antenna 118 and receiver 120 of the receive system 14. Data from the receiver 120 is processed by a processor 122. The processor 122 is running a clutter tuning algorithm 124. The clutter tuning algorithm 124 determines the optimal receiver motion for minimizing (or maximizing) the clutter Doppler spread and outputs this information to an aircraft control system 126. The clutter tuning algorithm needs to know the geometric conditions (locations and movements) of the receiver 14 and transmitter 12. Information about the transmitter maybe supplied by the data link signal 114 received by an antenna 130 and a data link receiver 132, and receiver information may be provided by a receiver navigational measurement device 128. The purpose of the navigational measurement device 128 is to accurately determine, relative to the Earth, the location of the receiver antenna 118. It also must determine, with adequate precision, the pointing direction of the antenna 118 relative to the Earth. The navigation measurement device 128 may make use of global positioning satellite (GPS) data as well as inertial measurement unit (IMU) data derived from an IMU located on the antenna 118.

In the illustrative embodiment of FIG. 3, the receiver motion is the parameter to be optimized by the clutter tuning algorithm. Alternate embodiments maybe designed which optimize the transmitter motion, or both the transmitter and receiver motion, without departing from the scope of the present teachings.

Figure 4:
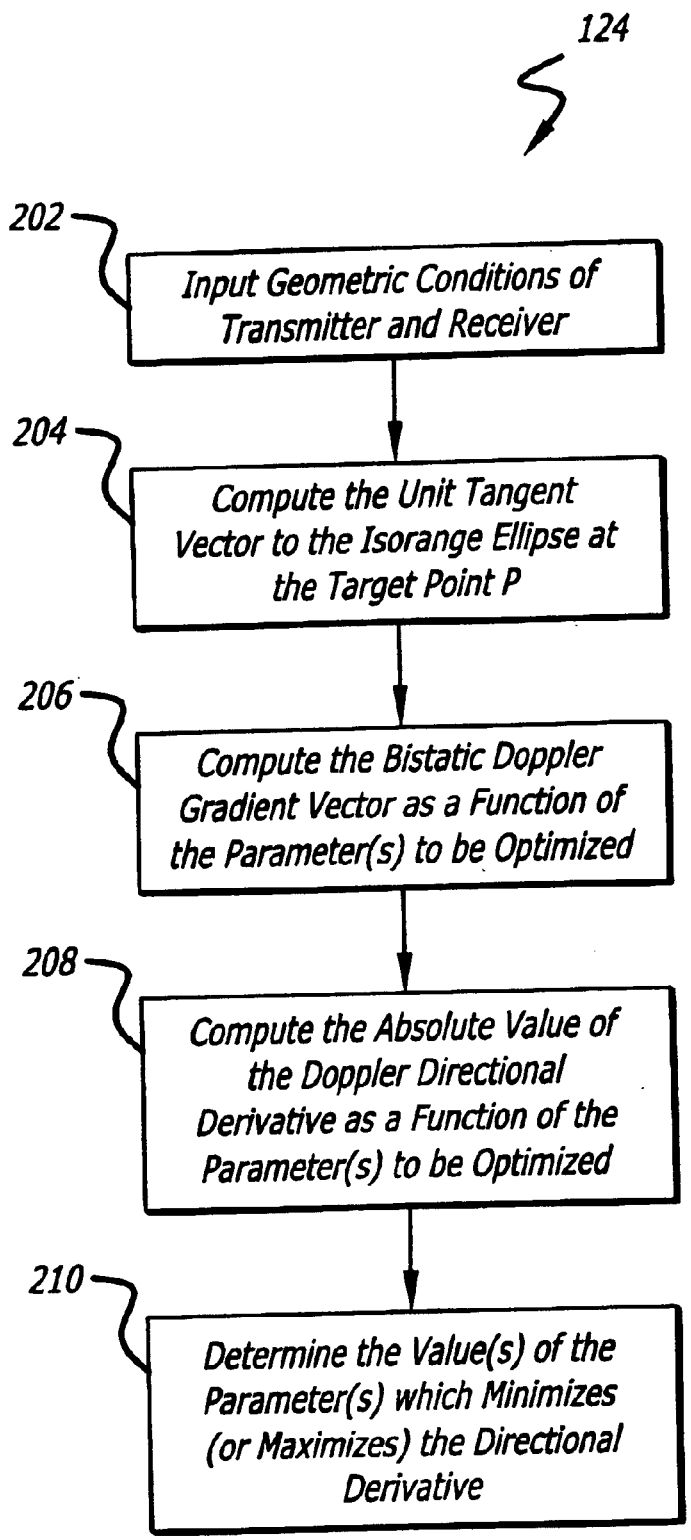
FIG. 4 is a flow diagram of an illustrative embodiment of a clutter tuning algorithm implemented in accordance with the teachings of the present invention.

FIG. 4 is a flow diagram of an illustrative embodiment of a clutter tuning algorithm 124 implemented in accordance with the teachings of the present invention. At Step 202, input the geometric conditions of the transmitter and receiver, including locations, line-of-sight directions, distances to the target. This information may be known a priori, and/or determined by navigational measurement devices.

At Step 204, compute the unit tangent vector $\vec{T}_u$ to the isorange ellipse at the target point P. As discussed above, one method for computing the unit tangent vector $\vec{T}_u$ includes the steps of: forming the equation of the isorange ellipse (Eqn. 6) based on the given transmitter-receiver-target geometry, differentiating with respect to x to yield the slope of the isorange tangent vector; and normalizing to obtain the unit tangent vector.

At Step 206, compute the bistatic Doppler gradient vector $\nabla f_D$ as a function of the parameter(s) to be optimized (the transmitter and/or receiver velocity vectors). The bistatic Doppler gradient vector $\nabla f_D$ is given by Eqn. 4.

At Step 208, compute the absolute value of the Doppler directional derivative J as a function of the parameter(s) to be optimized. This can be determined by taking the magnitude of the dot product of the bistatic Doppler gradient vector $\nabla f_D$ (from Step 206) and the unit tangent vector $\vec{T}_u$ (from Step 204), as shown in Eqn. 7.

At Step 210, determine the value(s) of the parameter(s) which minimizes (or maximizes) the directional derivative J. Minimizing the directional derivative yields the optimum condition(s) for minimizing the clutter Doppler spread (desirable for GMTI applications), while maximizing the directional derivative yields the optimum condition(s) for maximizing the clutter Doppler spread (desirable for SAR applications). Methods for minimizing and maximizing functions are well known in the art. Any method may be used without departing from the scope of the present teachings.

As mentioned above, for most practical applications, only the receiver flight azimuth direction θ is to be varied while the speed and altitude are maintained constant. For this case, the minima and maxima of the directional derivative can be determined explicitly. Substituting Eqn. 8 into Eqn. 7 results in a function of a single variable θ. The directional derivative can then be computed for various values of θ, and the minima and maxima explicitly found.

Figure 5:
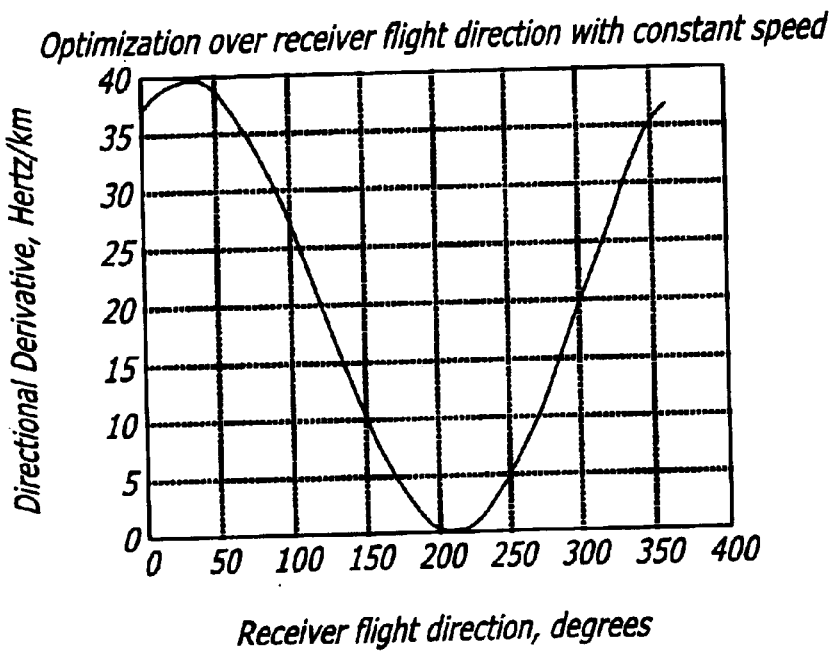
FIG. 5 is a graph of the directional derivative J as a function of receiver flight direction θ for a computer simulated example.
Figure 6:
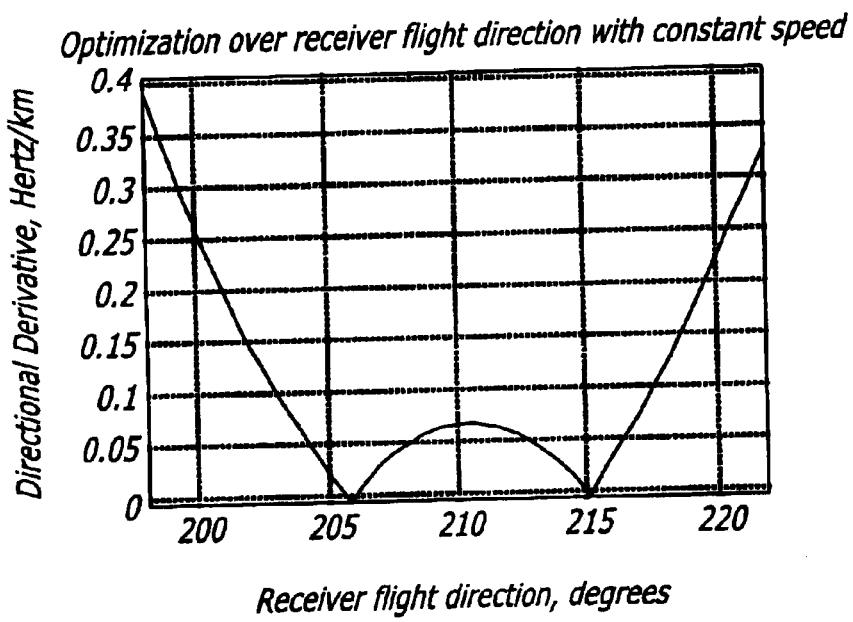
FIG. 6 is a magnified view of the graph of FIG. 5 near the minima.

FIG. 5 is a graph of the directional derivative J as a function of receiver flight direction θ for a computer simulated example. FIG. 6 is a magnified view of the graph of FIG. 5 near the minima. As can be seen in FIG. 6, there are two minima at about 206 and 215 degrees which result in near zero directional derivatives. FIG. 5 also shows that if, due to practical constraints, these "optimal" directions are not feasible, there exists a range of receiver directions around these minima for which the directional derivative is less than some preset amount. For instance, for a directional derivative of less than 15 Hz/km, the optimal receiver flight directions are from 134 degrees to 286 degrees. The optimum condition for SAR imaging is obtained as the receiver direction that maximizes the directional derivative which occurs at about 30 degrees in this example.

Figure 7:
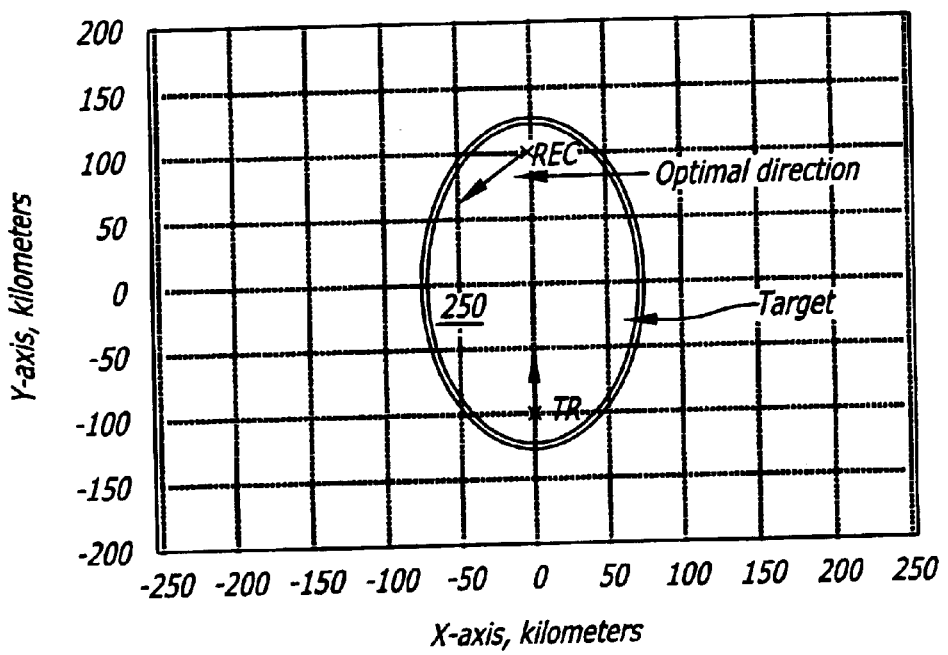
FIG. 7 is a graph showing the transmitter-receiver-target geometry and the isorange ellipse for the example of FIGS. 5 and 6.

FIG. 7 is a graph showing the transmitter-receiver-target geometry and the isorange ellipse for the example of FIGS. 5 and 6. The receiver velocity vector shown is the optimal one as determined by the method described here (215 degrees counter-clockwise from the positive y-axis). Note that the isorange ellipse has a certain thickness representing range cell. This thickness has been exaggerated for illustrative purposes.

Figure 8:
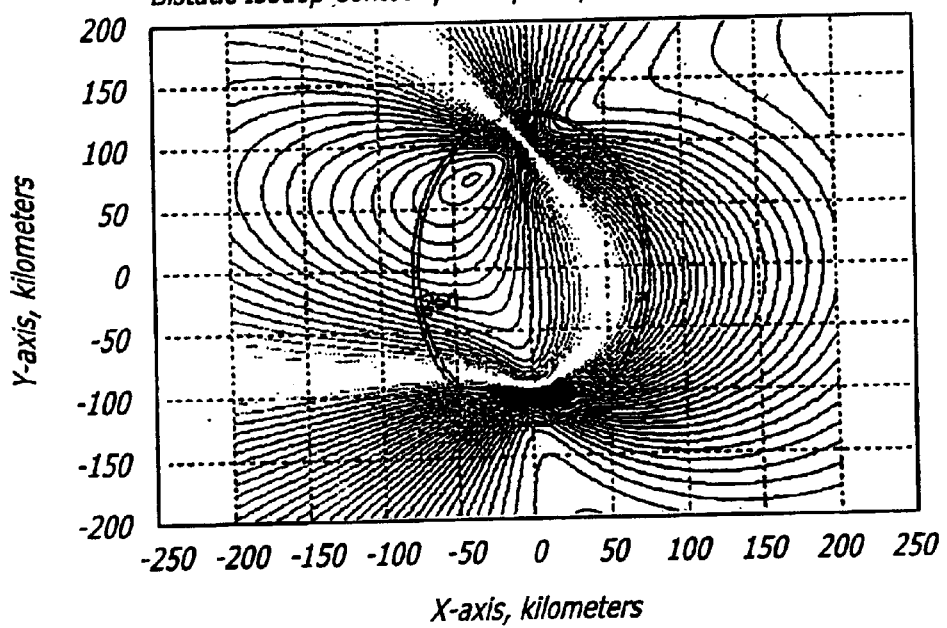
FIG. 8 is a graph showing the bistatic isodoppler contours superimposed on the isorange ellipse of FIG. 7.
Figure 9:
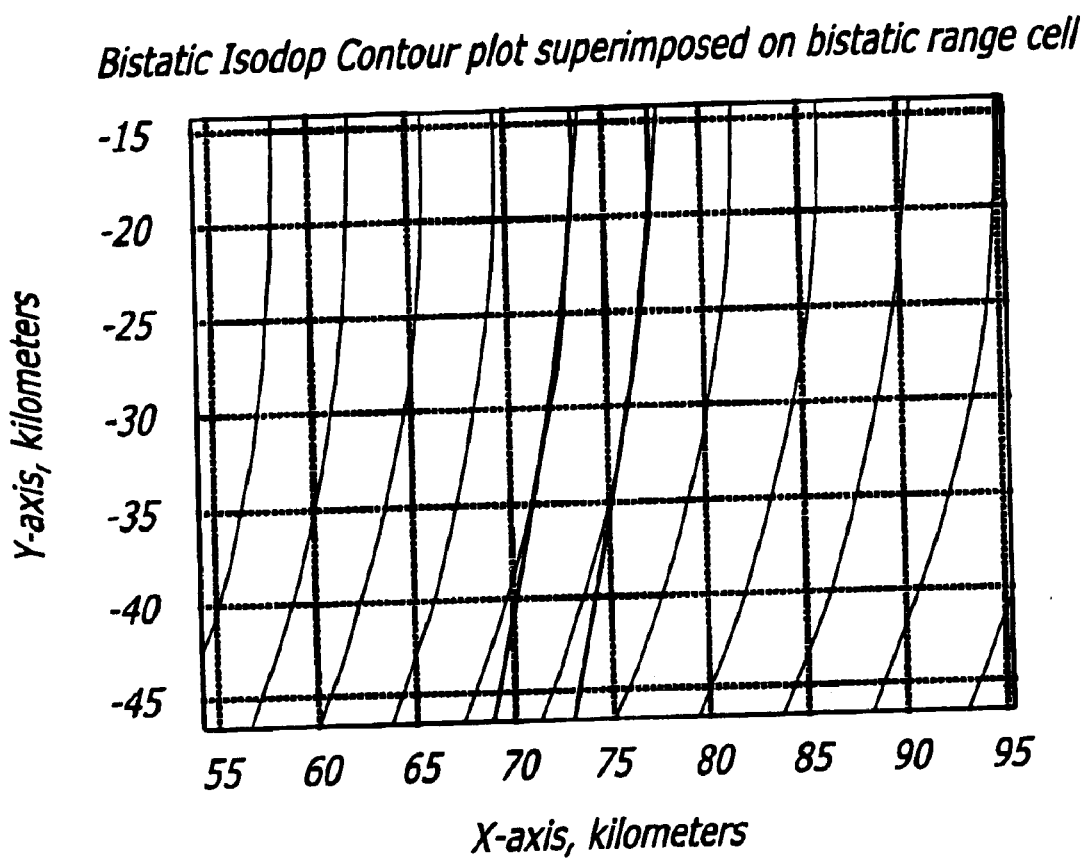
FIG. 9 is a magnified view of the graph of FIG. 8 near the vicinity of the target.

FIG. 8 is a graph showing the bistatic isodoppler contours superimposed on the isorange ellipse of FIG. 7. FIG. 9 is a magnified view of the graph of FIG. 8 near the vicinity of the target. Note that the bistatic isodops are almost parallel to the isorange ellipse in the neighborhood of the target, implying that for a small region along the range ring around the target there is almost zero variation in Doppler. This means that for a region corresponding to the intersection of the transmitter and receiver mainlobes, the clutter Doppler spread is minimal.

Thus, the present invention has been described herein with reference to a particular embodiment for a particular application. Those having ordinary skill in the art and access to the present teachings will recognize additional modifications, applications and embodiments within the scope thereof It is therefore intended by the appended claims to cover any and all such applications, modifications and embodiments within the scope of the present invention.

Accordingly,

What is claimed is:

1. A bistatic radar system comprising:
a transmitter for directing electromagnetic energy toward a target, said transmitter having a velocity vector $v_T$;
a receiver adapted to receive said electromagnetic energy reflected from said target, said receiver having a velocity vector $v_R$; and
means for optimizing a parameter of said transmitter and/or said receiver such that a directional derivative J of a bistatic Doppler field along an isorange contour is near a desired value.

2. The invention of claim 1 wherein said parameter includes the transmitter velocity vector $v_T$.

3. The invention of claim 1 wherein said parameter includes the receiver velocity vector $v_R$.

4. The invention of claim 1 wherein said parameter includes the receiver azimuth flight direction θ.

5. The invention of claim 1 wherein said parameter includes the speed of the receiver.

6. The invention of claim 1 wherein said desired value is the minimal absolute value of the directional derivative.

7. The invention of claim 1 wherein said desired value is the maximum absolute value of the directional derivative.

8. The invention of claim 1 wherein said desired value is a range of values of the directional derivative.

9. The invention of claim 1 wherein said directional derivative J is computed by taking the dot product of the bistatic Doppler gradient vector $\nabla f_D$ and the unit tangent vector to the isorange contour at the target point $\vec{T}_u$.

10. The invention of claim 9 wherein said the Doppler gradient vector $\nabla f_D$ is computed from the equation:

$$\nabla f_D = \frac{1}{\lambda}\left\{\frac{v_T - (v_T \cdot \vec{TP_u})\vec{TP_u}}{R_1} + \frac{v_R - (v_R \cdot \vec{RP_u})\vec{RP_u}}{R_2}\right\},$$

where $\vec{TP}_u$ and $\vec{RP}_u$ are the unit line-of-sight vectors from the transmitter and receiver to the target point, respectively, $R_1$ and $R_2$ are the distances from the transmitter and receiver to the target point, respectively, and λ is the wavelength of the electromagnetic energy.

11. The invention of claim 9 wherein said unit tangent vector $\vec{T}_u$ is computed by forming the equation of the isorange contour, differentiating to yield the slope, and normalizing.

12. The invention of claim 11 wherein said isorange contour is an ellipse whose equation is in the form of $ax^2+by^2+2cxy+dx+ey+f=0$, where a, b, c, d, e, and f are coefficients obtained from the given transmitter-receiver-target geometry.

13. The invention of claim 1 wherein said means for optimizing includes explicitly computing the values of said directional derivative for varying values of said parameter (s).

14. A bistatic radar system comprising:
a transmitter for directing electromagnetic energy toward a target, said transmitter having a velocity vector $v_T$;
a receiver adapted to receive said electromagnetic energy reflected from said target, said receiver having a velocity vector $v_R$;
a processor for computing an optimal motion of said transmitter and/or said receiver such that a directional derivative J of a bistatic Doppler field along an isorange contour is near a desired value; and
a system for controlling the motion of said transmitter and/or said receiver based on said optimal motion.

15. A method for controlling the clutter Doppler spread of a bistatic radar system including the steps of:
computing the directional derivative J of the bistatic Doppler field along the isorange contour as a function of a parameter or parameters to be optimized and
determining the value or values of said parameter(s) which yield a desired directional derivative.

16. The invention of claim 15 wherein said desired directional derivative is the minimal absolute value of the directional derivative for minimizing the clutter Doppler spread.

17. The invention of claim 15 wherein said desired directional derivative is the maximum absolute value of the directional derivative for maximizing the clutter Doppler spread.

18. The invention of claim 15 wherein said desired directional derivative is a range of values of the directional derivative.

19. The invention of claim 15 wherein said parameter includes a transmitter velocity vector $v_T$.

20. The invention of claim 15 wherein said parameter includes a receiver velocity vector $v_R$.

21. The invention of claim 15 wherein said parameter includes a receiver azimuth flight direction $\theta$.

22. The invention of claim 15 wherein said parameter includes a speed of the receiver.

23. The invention of claim 15 wherein said directional derivative J is computed by taking the vector dot product of the bistatic Doppler gradient vector $\nabla f_D$ and the unit tangent vector to the isorange contour at the target point $\vec{T}_u$.

24. The invention of claim 23 wherein said the Doppler gradient vector $\nabla f_D$ is computed from the equation:

$$\nabla f_D = \frac{1}{\lambda}\left\{\frac{v_T - (v_T \cdot \vec{TP_u})\vec{TP_u}}{R_1} + \frac{v_R - (v_R \cdot \vec{RP_u})\vec{RP_u}}{R_2}\right\},$$

where $\vec{TP}_u$ and $\vec{RP}_u$ are the unit line-of-sight vectors from the transmitter and receiver to the target point, respectively, $R_1$ and $R_2$ are the distances from the transmitter and receiver to the target point, respectively, and $\lambda$ is the wavelength of the electromagnetic energy.

25. The invention of claim 23 wherein said unit tangent vector $\vec{T}_u$ is computed by forming the equation of the isorange contour, differentiating to yield the slope, and normalizing.

26. The invention of claim 25 wherein said isorange contour is an ellipse whose equation is in the form of $ax^2+by^2+2cxy+dx+ey+f=0$, where a, b, c, d, e, and f are coefficients obtained from the given transmitter-receiver-target geometry.

* * * * *